Patented June 7, 1932

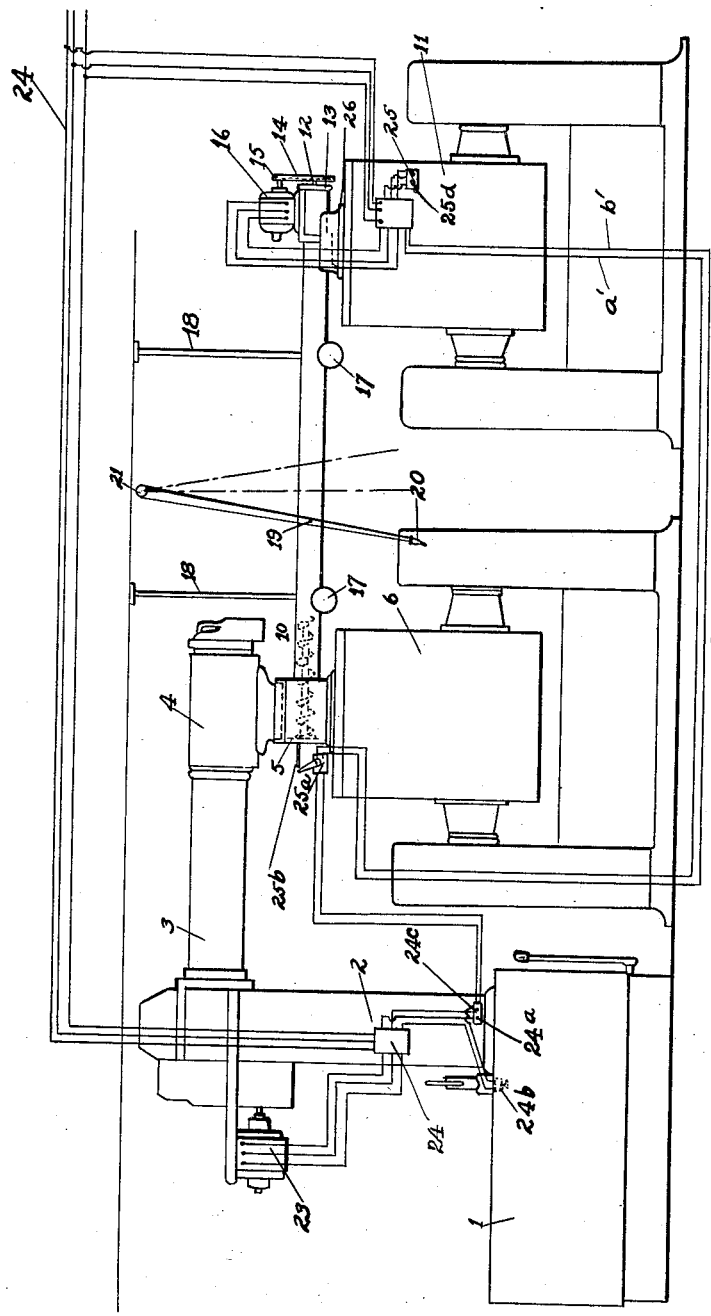

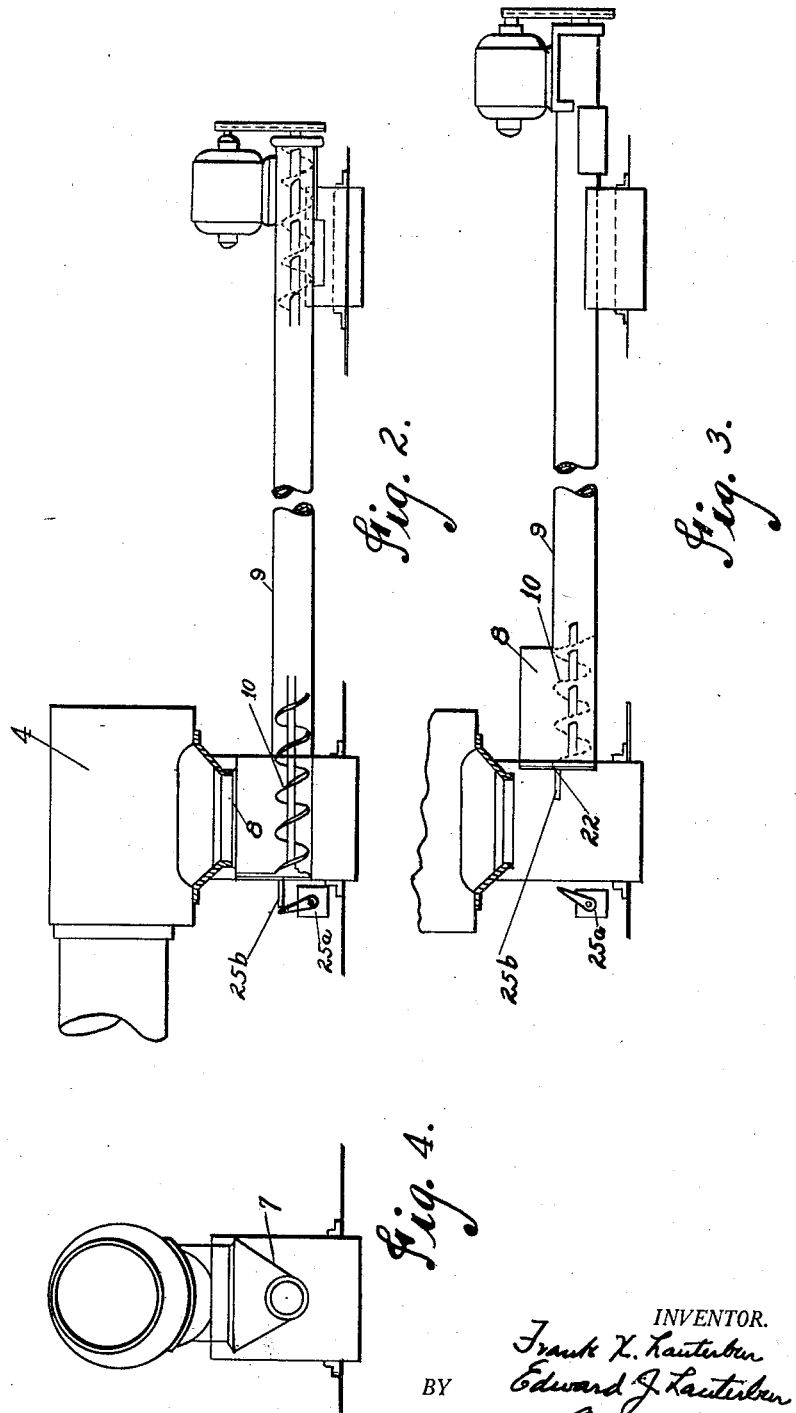

1,861,803

UNITED STATES PATENT OFFICE

FRANK X. LAUTERBUR AND EDWARD J. LAUTERBUR, OF SIDNEY, OHIO

WEIGHING, BLENDING, CONVEYING, ELEVATING, AND SIFTING MACHINE

Application filed October 18, 1929. Serial No. 400,657.

Our invention relates to weighing, blending, elevating and sifting machines, and particularly to a conveying arrangement in which sifted products can be supplied to more than one dough mixer.

In our application Serial No. 329,739, we have described a combination of apparatus in which the net quantity of flour discharged from the sifter is indicated in a direct reading. Our present invention relates to this same type of apparatus, with the added feature that we have provided a conveyor which will permit sifted flour to be discharged to either of more than one dough mixer.

In combination with a sifting mechanism and more than one dough mixer, it is our object to provide conveying apparatus which can be quickly shifted so that flour may be discharged into one mixer or another, as desired, and in which the conveyor is so constructed and arranged that leakage does not occur, and that all the flour discharged from the sifter will definitely be received in the desired dough mixer.

It is further our object to provide a motor independently wired in connection with the conveying apparatus which will have suitable connections so that when the sifting apparatus is set in operation the motor will be started, but which will have an independent switch so that the motor will not stop running until a desired interval after the sifter has been shut down.

The above objects and other structural improvements in this type of apparatus we accomplish by that certain combination and arrangement of parts of which we have shown a preferred modification.

Referring to the drawings:—

Figure 1 is a diagrammatic view of a complete weighing, blending, elevating and sifting machine with a diverting conveyor associated therewith so that flour can be discharged into either of the more than one dough mixer shown.

Figure 2 is a diagrammatic side elevation of the preferred type of diverting conveyor shown in position to convey sifted flour to the dough mixer shown at the right.

Figure 3 is a diagrammatic side elevation of the conveyor shown in Figure 2 arranged to permit the sifted flour to discharge into the mixer shown at the left.

Figure 4 is an end elevation of the mixer of the diverting conveyor shown in the other figures.

The mixer shown includes a blending bin 1 from which the flour is conveyed through a bucket conveyor 2 into a screw conveyor 3. The screw conveyor feeds the flour into the sifting head 4 from which it will drop by gravity through the casing head 5 into the dough mixer 6 shown at the left, when the tubular conveyor is in the position shown in Figure 3. The casing head 5, as indicated in Figure 4, has a triangular opening 7 in it into which a trough-shaped end 8 of a tubular conveyor casing 9 may be slidably inserted. Within the conveyor casing 9 we have shown the worm 10 which advances the flour dropping out of the sifter into the dough mixer indicated at 11. The end 12 of the shaft on which the worm is mounted is provided with a gear wheel 13, which is driven by a chain 14 from the pinion 15 of an electric motor 16.

We have shown guiding rollers 17 suspended from the ceiling of the room in which the apparatus is mounted by supporting bars 18. There is a trunnion 19 or the like extending out from the side of the conveyor casing, and a shifting lever having a handle 20 and pivoted in a suitable bearing as at 21 may be employed for moving the conveyor from its operative to its non-operating position, or vice versa. The trough-shaped end 8 of the conveyor casing has an end plate 22 which effectively seals the opening through which it passes into the casing head 5 when the conveyor is in inoperative position.

The electric motor for driving the sifter is indicated at 23, and power lines are extended from the switch 24 to both the motor 23 and the motor 16. Arrangement may be made for the sifter motor 23 and the conveyor motor 16 to start simultaneously from the push button 24a with dual connections of lines a' and b' to both starters. As it is usually necessary for the conveyor motor 16 to run a longer period than the sifter, we have provided separate stop controls for the motors. The sifter motor 23 stops from a disconnecting limit switch 24b in a control circuit actuated by the weighing beam, or it may be stopped by the stop button 24c. The conveyor motor is stopped by the push button 25 when desired, and it may also be started by the auxiliary starter button 25d. This enables the diverting conveyor to run a longer time than the sifter, so that complete discharge of any material being diverted to the dough mixer 11 can be assured. Further, when flour is being sifted and discharged into the dough mixer 6, the motor 16 need not be operated.

In the wiring diagram shown in connection with Figure 1, the main weighing sifter motor and the auxiliary conveyor motor may be started from the sifter starting push button 24 provided the auxiliary conveyor is in position to receive the flour from the weighing sifter. When this conveyor is not in position to receive the flour, the disconnecting switch or limit switch 25a has been opened preventing completion of the circuit to the auxiliary motor but permitting the weighing sifter motor to start. The disconnecting switch 25a may be mounted to operate from a trigger 25b on the sliding conveyor. With the conveyor in the position shown in Figure 2, the circuits a' and b' (as shown in Figure 5) are closed. With the conveyor in the position shown in Figure 3, the circuits a' and b' (as shown in Figure 5) are open, and the motor 16 is not operating. By moving the conveyor out of receiving position lines a' and b' of the auxiliary conveyor motor switch are broken, preventing the starting of this motor, but still permitting the starting of the weighing sifter motor.

The capacity of a standard unit of blending, elevating, sifting and weighing is such that it will provide an ample supply for more than one dough mixer. Also, when one dough mixer is mixing a batch of dough flour can be sifted and weighed out into another mixer. The entire apparatus is dust-proof, and we may provide slide bearings 26 on dough mixer 11 to assist in supporting the weight of the conveying apparatus. The important feature of our construction is, that it permits great accuracy of weighing out a desired quantity of sifted flour into more than one dough mixer, and minimizes, to a large extent, the possibility of error in the amount of ingredients going into a dough batch.

Having thus described our invention, what we claim as new and desire to secure by Letters Patent, is:—

1. In combination with flour sifting apparatus and two dough mixers, one of which is arranged to receive a gravity discharge of flour from said sifter, means for diverting said gravity discharge into said other dough mixer.

2. In combination with flour sifting apparatus and two dough mixers, one of which is arranged to receive a gravity discharge of flour from said sifter, means for diverting said gravity discharge into said other dough mixer comprising a conveyor.

3. In combination with flour sifting apparatus and two dough mixers, one of which is arranged to receive a gravity discharge of flour from said sifter, means for diverting said gravity discharge into said other dough mixer comprising a conveyor having a trough receiving end portion movable into position to receive said gravity discharge.

4. In combination with flour sifting apparatus and two dough mixers, one of which is arranged to receive a gravity discharge of flour from said sifter, means for diverting said gravity discharge into said other dough mixer comprising a conveyor having a trough receiving end portion movable into position to receive said gravity discharge, said trough receiving end portion having a barrier member to form a dust-proof seal when said diverting means is moved to inoperative position.

5. In combination with flour blending, elevating, conveying and sifting mechanism and an electric motor for actuating same, means for diverting the discharge from said sifting mechanism so that it will be received in different positions, said diverting means having an independent electric motor for actuating same, a switch wired to said motors so that both may be started with the turning on of the switch, and an independent switch in the wires to said second named motor for turning same off independently of the turning off of the first named motor.

6. In combination with flour blending, elevating, conveying and sifting mechanism and an electric motor for actuating same, means for diverting the discharge from said sifting mechanism so that it will be received in different positions, said diverting means having an independent electric motor for actuating same, a switch wired to said motors so that both may be started with the turning on the switch, and an independent switch in the wires to said second named motor for turning same off independently of the turning off of the first named motor, said diverting means operated at such a rate of speed as to have greater capacity than said conveying and sifting mechanism.

7. In combination with flour blending, elevating, conveying and sifting mechanism and at least two dough mixers for receiving weighed batches from said sifting mechanism, means for diverting sifted batches of flour from one mixer to another, means for starting in operation all the mechanism heretofore noted, and means for independently controlling the shutting off of said diverting means.

8. In combination with flour blending, elevating, conveying and sifting mechanism and at least two dough mixers for receiving weighted batches from said sifting mechanism, means for diverting sifted batches of flour from one mixer to another, means for starting in operation all the mechanism heretofore noted, and means for independently controlling the shutting off of said diverting means, said diverting means comprising a conveyor having an independent electric motor for actuating same.

9. In combination with automatically controlled discharging mechanism, mechanism for diverting material discharged from said first noted mechanism to a plurality of positions, an electric motor for actuating said diverting mechanism, starting means for both said mechanisms, and independent stopping means for said diverting mechanism.

10. In combination with automatically controlled discharging mechanism, mechanism for diverting material discharged from said first noted mechanism to a position other than that into which said discharging mechanism would normally discharge, means for actuating said diverting mechanism, and means for inhibiting said actuating means.

11. In combination with automatically controlled discharging mechanism, mechanism for diverting material discharged from said first noted mechanism to a position other than that into which said discharging mechanism would normally discharge, means for actuating said diverting mechanism, and means for inhibiting said actuating means, said inhibiting means being automatically controlled by the position of said diverting mechanism.

12. In combination with automatically controlled discharging mechanism, mechanism for diverting material discharged from said first noted mechanism to a plurality of positions, an electric motor for actuating said diverting mechanism, starting means for both said mechanisms, and independent stopping means for said diverting mechanism, said independent stopping means comprising a switch having a mechanical connection with said diverting mechanism.

FRANK X. LAUTERBUR.
EDWARD J. LAUTERBUR.